(12) United States Patent
Halli et al.

(10) Patent No.: US 9,646,123 B2
(45) Date of Patent: May 9, 2017

(54) STANDARD CELL DESIGN WITH REDUCED CELL DELAY

(71) Applicant: Texas Instruments Incorporated, Dallas, TX (US)

(72) Inventors: Ramesh Mallikarjun Halli, Karnataka (IN); Subhankar Das, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 183 days.

(21) Appl. No.: 14/587,851

(22) Filed: Dec. 31, 2014

(65) Prior Publication Data

US 2016/0188758 A1 Jun. 30, 2016

(51) Int. Cl.
*G06F 17/50* (2006.01)

(52) U.S. Cl.
CPC ........ *G06F 17/505* (2013.01); *G06F 2217/84* (2013.01)

(58) Field of Classification Search
CPC .................. G06F 17/5031; G06F 2217/84
USPC .......................................................... 716/108
See application file for complete search history.

(56) References Cited

U.S. PATENT DOCUMENTS

| | | | |
|---|---|---|---|
| 8,759,885 B1* | 6/2014 | Jain et al. | 257/204 |
| 2005/0172245 A1* | 8/2005 | Anderson | 716/3 |
| 2009/0066369 A1* | 3/2009 | Das | 326/93 |
| 2013/0043923 A1* | 2/2013 | Gasper et al. | 327/281 |
| 2013/0069691 A1* | 3/2013 | Sundareswaran | 326/38 |
| 2013/0069703 A1* | 3/2013 | Gasper et al. | 327/264 |
| 2013/0185692 A1* | 7/2013 | Kim et al. | 716/134 |
| 2015/0263039 A1* | 9/2015 | Singh et al. | 716/134 |

\* cited by examiner

*Primary Examiner* — Suchin Parihar
(74) *Attorney, Agent, or Firm* — John R. Pessetto; Charles A. Brill; Frank D. Cimino

(57) ABSTRACT

The disclosure provides a standard cell. The standard cell includes a first PMOS transistor and a second PMOS transistor whose gate terminal respectively receives a first input and a second input. A drain terminal of each of the first PMOS transistor and the second PMOS transistor is coupled to a first node. The standard cell further includes a first NMOS transistor and a third NMOS transistor whose gate terminal respectively receive the first input and the second input. A drain terminal of each of the first NMOS transistor and the third NMOS transistor is coupled to the first node. The first NMOS transistor is coupled to a second NMOS transistor, and the third NMOS transistor is coupled to a fourth NMOS transistor. A gate terminal of the second NMOS transistor and the fourth NMOS transistor respectively receives the second input and the first input.

20 Claims, 3 Drawing Sheets

STANDARD CELL DESIGN WITH REDUCED CELL DELAY

TECHNICAL FIELD

The present disclosure is generally related to standard cell designs, and more particularly to reducing cell delay in a standard cell design.

BACKGROUND

Computer-aided standard cell-based design has been developed for quickly designing large scale ICs such as application specific integrated circuits (ASICs). The standard cell is a circuit that has been pre-designed and pre-verified as a building block. Design technologies known as standard cell library use different types of such building blocks. Each distinct standard cell in a library may have unique geometries of active, gate, and metal levels. Examples of a standard cell include an inverter, a NAND gate, a NOR gate, a Boolean function gate, a flip flop, and other similar logic circuits.

In any digital block implementation, the performance and speed of a digital block is mainly determined by high drive standard cells in a standard cell library. In advanced technology nodes, parasitic capacitances and resistances play a major role in degrading the performance of the digital blocks. Due to these parasitic capacitances and resistances, the performance of multi-input standard cells is getting affected at advanced technology nodes especially 28 nm node and beyond. This has resulted in lesser usage of such multi-input standard cells, which are primarily area efficient, in the high-speed digital blocks. Moreover, during synthesis, the usability of such standard cells is determined by the worst path delay of the standard cell.

SUMMARY

An aspect of the disclosure provides a standard cell. The standard cell includes a first PMOS transistor and a second PMOS transistor whose gate terminal respectively receives a first input and a second input. A drain terminal of each of the first PMOS transistor and the second PMOS transistor is coupled to a first node.

The standard cell further includes a first NMOS transistor and a third NMOS transistor whose gate terminal respectively receive the first input and the second input. A drain terminal of each of the first NMOS transistor and the third NMOS transistor is coupled to the first node.

The first NMOS transistor is coupled to a second NMOS transistor, and the third NMOS transistor is coupled to a fourth NMOS transistor. A gate terminal of the second NMOS transistor and the fourth NMOS transistor respectively receives the second input and the first input.

BRIEF DESCRIPTION OF THE VIEWS OF DRAWINGS

DETAILED DESCRIPTION OF THE EMBODIMENTS

Figure 1:
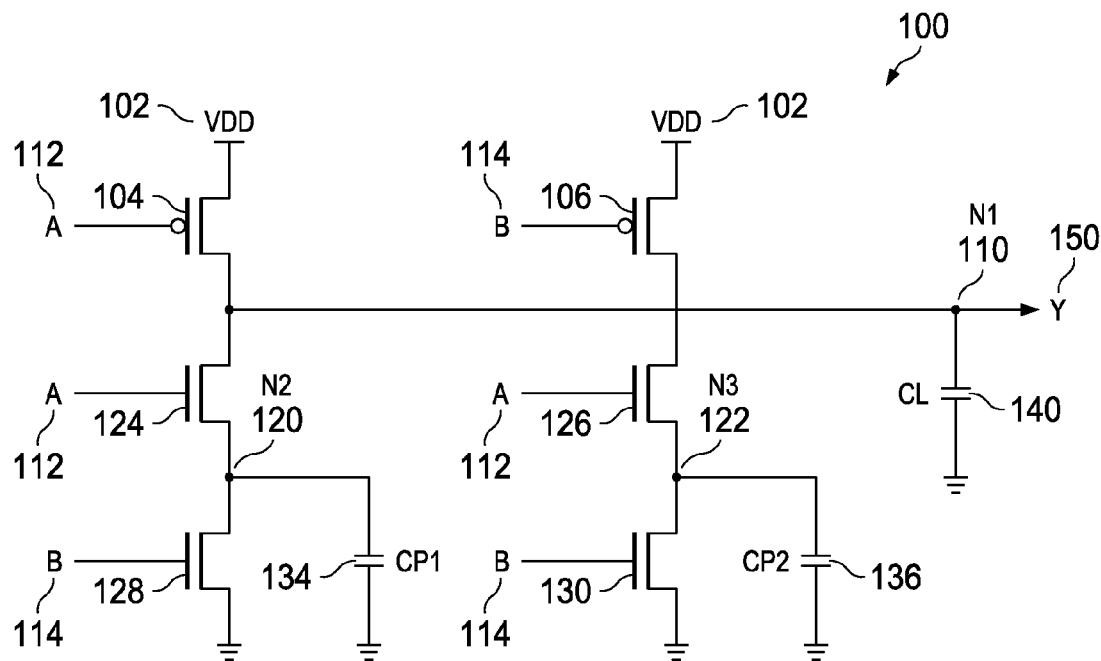
FIG. 1 illustrates a schematic of a standard cell.

FIG. 1 illustrates a schematic of a standard cell 100. The standard cell 100 includes a first PMOS transistor 104, a second PMOS transistor 106, a first NMOS transistor 124, a second NMOS transistor 128, a third NMOS transistor 126 and a fourth NMOS transistor 130. A gate terminal of the first PMOS transistor 104 receives a first input A 112. A source terminal of the first PMOS transistor 104 is coupled to a power terminal VDD 102. A drain terminal of the first PMOS transistor 104 is coupled to a first node N1 110.

A gate terminal of the second PMOS transistor 106 receives a second input B 114. A source terminal of the second PMOS transistor 106 is coupled to the power terminal VDD 102. A drain terminal of the second PMOS transistor 106 is coupled to the first node N1 110. A gate terminal of the first NMOS transistor 124 receives the first input A 112. A source terminal of the first NMOS transistor 124 is coupled to a second node N2 120. A drain terminal of the first NMOS transistor 124 is coupled to the first node N1 110.

A gate terminal of the second NMOS transistor 128 receives the second input B 114. A source terminal of the second NMOS transistor 128 is coupled to a ground terminal. A drain terminal of the second NMOS transistor 128 is coupled to the source terminal of the first NMOS transistor 124 to form the second node N2 120. A gate terminal of the third NMOS transistor 126 receives the first input A 112. A source terminal of the third NMOS transistor 126 is coupled to a third node N3 122. A drain terminal of the third NMOS transistor 126 is coupled to the first node N1 110.

A gate terminal of the fourth NMOS transistor 130 receives the second input B 114. A source terminal of the fourth NMOS transistor 130 is coupled to a ground terminal. A drain terminal of the fourth NMOS transistor 130 is coupled to the source terminal of the third NMOS transistor 126 to form the third node N3 122. A standard cell output Y 150 is generated at the first node N1 110. A load capacitance CL 140 is coupled between the first node N1 110 and the ground terminal.

A first parasitic capacitance CP1 134 is coupled between the second node N2 120 and the ground terminal. A second parasitic capacitance CP2 136 is coupled between the third node N3 122 and the ground terminal. It is understood that the first parasitic capacitance CP1 134 and the second parasitic capacitance CP2 136 are physical representation of capacitances created between drain terminal and ground terminal of the transistors associated with the second node N2 120 and the third node N3 122 respectively.

The operation of the standard cell 100 illustrated in FIG. 1 is explained now. When the second input B 114 transitions from a logic low to a logic high and the first input A 112 is at logic high, the standard cell output Y 150 transition from a logic high to a logic low. During these transitions, the load capacitance CL 140, the first parasitic capacitance CP1 134 and the second parasitic capacitance CP2 136 are discharged.

Similarly, when the second input B 114 transitions from a logic high to a logic low and the first input A 112 is at logic high, the standard cell output Y 150 transition from a logic low to a logic high. During these transitions, the load capacitance CL 140, the first parasitic capacitance CP1 134 and the second parasitic capacitance CP2 136 are charged.

The transition of the second input B 114 and the corresponding transition in the standard cell output Y 150 represent a worst path delay of the standard cell 100. When the first input A 112 transitions from a logic high to a logic low and the second input B 114 is at logic high, the standard cell output Y 150 transition from a logic low to logic high. During these transitions, only the load capacitance CL 140 is required to be charged.

Similarly, when the first input A 112 transitions from a logic low to a logic high and the second input B 114 is at logic high, the standard cell output Y 150 transition from a logic high to logic low. During these transitions, only the load capacitance CL 140 is required to be charged. The transition of the first input A 112 and the corresponding transition in the standard cell output Y 150 represent a minimum delay of the standard cell 100.

The usability of a standard cell is determined from the worst path delay of the standard cell. A standard cell with lower worst path delay finds a higher usage in high speed digital blocks.

Figure 2:
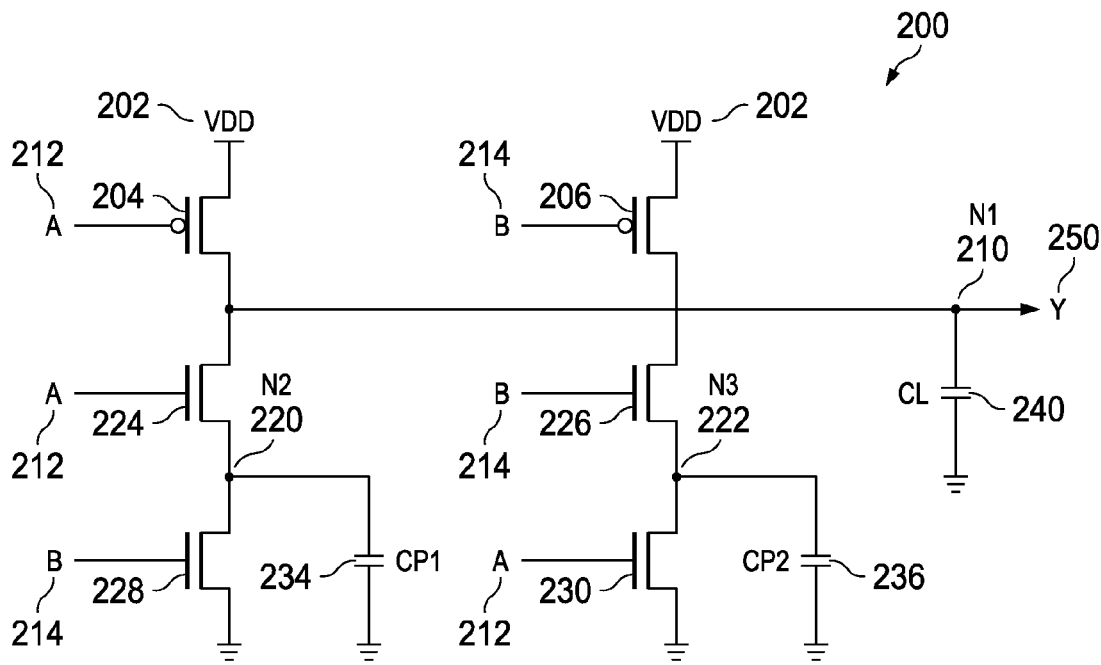
FIG. 2 illustrates a schematic of a standard cell, according to an embodiment.

FIG. 2 illustrates a schematic of a standard cell 200, according to an embodiment. The standard cell 200 includes a first PMOS transistor 204, a second PMOS transistor 206, a first NMOS transistor 224, a second NMOS transistor 228, a third NMOS transistor 226 and a fourth NMOS transistor 230. A gate terminal of the first PMOS transistor 204 receives a first input A 212. A source terminal of the first PMOS transistor 204 is coupled to a power terminal VDD 202. A drain terminal of the first PMOS transistor 204 is coupled to a first node N1 210.

A gate terminal of the second PMOS transistor 206 receives a second input B 214. A source terminal of the second PMOS transistor 206 is coupled to the power terminal VDD 202. A drain terminal of the second PMOS transistor 206 is coupled to the first node N1 210. A gate terminal of the first NMOS transistor 224 receives the first input A 212. A source terminal of the first NMOS transistor 224 is coupled to a second node N2 220. A drain terminal of the first NMOS transistor 224 is coupled to the first node N1 210.

A gate terminal of the second NMOS transistor 228 receives the second input B 214. A source terminal of the second NMOS transistor 228 is coupled to a ground terminal. A drain terminal of the second NMOS transistor 228 is coupled to the source terminal of the first NMOS transistor 224 to form the second node N2 220. A gate terminal of the third NMOS transistor 226 receives the second input B 214. A source terminal of the third NMOS transistor 226 is coupled to a third node N3 222. A drain terminal of the third NMOS transistor 226 is coupled to the first node N1 210.

A gate terminal of the fourth NMOS transistor 230 receives the first input A 212. A source terminal of the fourth NMOS transistor 230 is coupled to a ground terminal. A drain terminal of the fourth NMOS transistor 230 is coupled to the source terminal of the third NMOS transistor 226 to form the third node N3 222. A standard cell output Y 250 is generated at the first node N1 210. A load capacitance CL 240 is coupled between the first node N1 210 and the ground terminal.

A first parasitic capacitance CP1 234 is coupled between the second node N2 220 and the ground terminal. A second parasitic capacitance CP2 236 is coupled between the third node N3 222 and the ground terminal. It is understood that the first parasitic capacitance CP1 234 and the second parasitic capacitance CP2 236 are physical representation of capacitances created between drain terminal and ground terminal of the transistors associated with the second node N2 220 and the third node N3 222 respectively. The standard cell 200 may include one or more additional components known to those skilled in the relevant art and are not discussed here for simplicity of the description.

The operation of the standard cell 200 illustrated in FIG. 2 is explained now. When the second input B 214 transitions from a logic low to a logic high and the first input A 212 is at logic high, the standard cell output Y 250 transition from a logic high to a logic low. During these transitions, the load capacitance CL 240 and the first parasitic capacitance CP1 234 are discharged.

Similarly, when the second input B 214 transitions from a logic high to a logic low and the first input A 212 is at logic high, the standard cell output Y 250 transition from a logic low to a logic high. During these transitions, the load capacitance CL 240 and the first parasitic capacitance CP1 234 are charged.

The transition of the second input B 214 and the corresponding transition in the standard cell output Y 250 represent a worst path delay of the standard cell 200. The usability of a standard cell is determined from the worst path delay of the standard cell. Thus, the worst path delay of the standard cell 200 is reduced as compared to the standard cell 100. In standard cell 200, the second parasitic capacitance CP2 236 is not required to be charged when the second input B 214 transitions. Thus, the standard cell 200 finds higher usage in high speed digital blocks.

Figure 3:
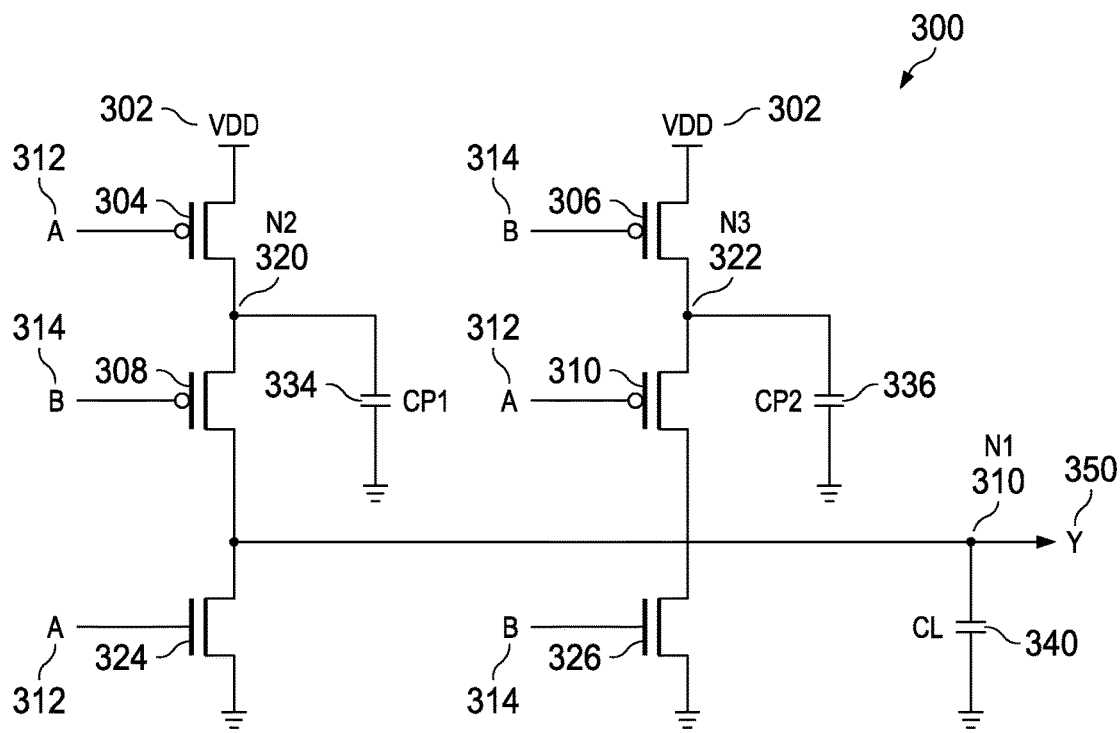
FIG. 3 illustrates a schematic of a standard cell, according to an embodiment.

FIG. 3 illustrates a schematic of a standard cell 300, according to an embodiment. The standard cell 300 includes a first PMOS transistor 304, a second PMOS transistor 308, a third PMOS transistor 306, a fourth PMOS transistor 310, a first NMOS transistor 324 and a second NMOS transistor 326. A gate terminal of the first PMOS transistor 304 receives a first input A 312. A source terminal of the first PMOS transistor 304 is coupled to a power terminal VDD 302. A drain terminal of the first PMOS transistor 304 is coupled to a second node N2 320.

A gate terminal of the second PMOS transistor 308 receives a second input B 314. A source terminal of the second PMOS transistor 308 is coupled to the drain terminal of the first PMOS transistor 304 to form the second node N2 320. A drain terminal of the second PMOS transistor 308 is coupled to a first node N1 310. A gate terminal of the third PMOS transistor 306 receives the second input B 314. A source terminal of the third PMOS transistor 306 is coupled to the power terminal VDD 302. A drain terminal of the third PMOS transistor 306 is coupled to a third node N3 322.

A gate terminal of the fourth PMOS transistor 310 receives a first input A 312. A source terminal of the fourth PMOS transistor 310 is coupled to the drain terminal of the third PMOS transistor 306 to form the third node N3 322. A drain terminal of the fourth PMOS transistor 310 is coupled to the first node N1 310.

A gate terminal of the first NMOS transistor 324 receives the first input A 312. A source terminal of the first NMOS transistor 324 is coupled to a ground terminal. A drain terminal of the first NMOS transistor 324 is coupled to the first node N1 310. A gate terminal of the second NMOS transistor 326 receives the first input A 312. A source terminal of the second NMOS transistor 326 is coupled to a ground terminal. A drain terminal of the second NMOS transistor 326 is coupled to the first node N1 310.

A standard cell output Y 350 is generated at the first node N1 310. A load capacitance CL 340 is coupled between the first node N1 310 and the ground terminal. A first parasitic capacitance CP1 334 is coupled between the second node N2 320 and the ground terminal. A second parasitic capacitance CP2 336 is coupled between the third node N3 322 and the ground terminal.

It is understood that the first parasitic capacitance CP1 334 and the second parasitic capacitance CP2 336 are physical representation of capacitances created between drain terminal and ground terminal of the transistors associated with the second node N2 320 and the third node N3 322 respectively. The standard cell 300 may include one or more additional components known to those skilled in the relevant art and are not discussed here for simplicity of the description.

The operation of the standard cell 300 illustrated in FIG. 3 is explained now. When the second input B 314 transitions from a logic low to a logic high and the first input A 312 is at logic low, the standard cell output Y 350 transition from a logic high to a logic low. During these transitions, the load capacitance CL 340 and the second parasitic capacitance CP2 336 are discharged.

Similarly, when the second input B 314 transitions from a logic high to a logic low and the first input A 312 is at logic low, the standard cell output Y 350 transition from a logic low to a logic high. During these transitions, the load capacitance CL 340 and the second parasitic capacitance CP2 336 are charged.

The transition of the second input B 314 and the corresponding transition in the standard cell output Y 350 represent a worst path delay of the standard cell 300. The usability of a standard cell is determined from the worst path delay of the standard cell.

Thus, the worst path delay of the standard cell 300 is reduced as compared to existing standard cells. In standard cell 300, the first parasitic capacitance CP1 334 is not required to be charged when the second input B 314 transitions. Thus, the standard cell 300 finds higher usage in high speed digital blocks.

Figure 4:
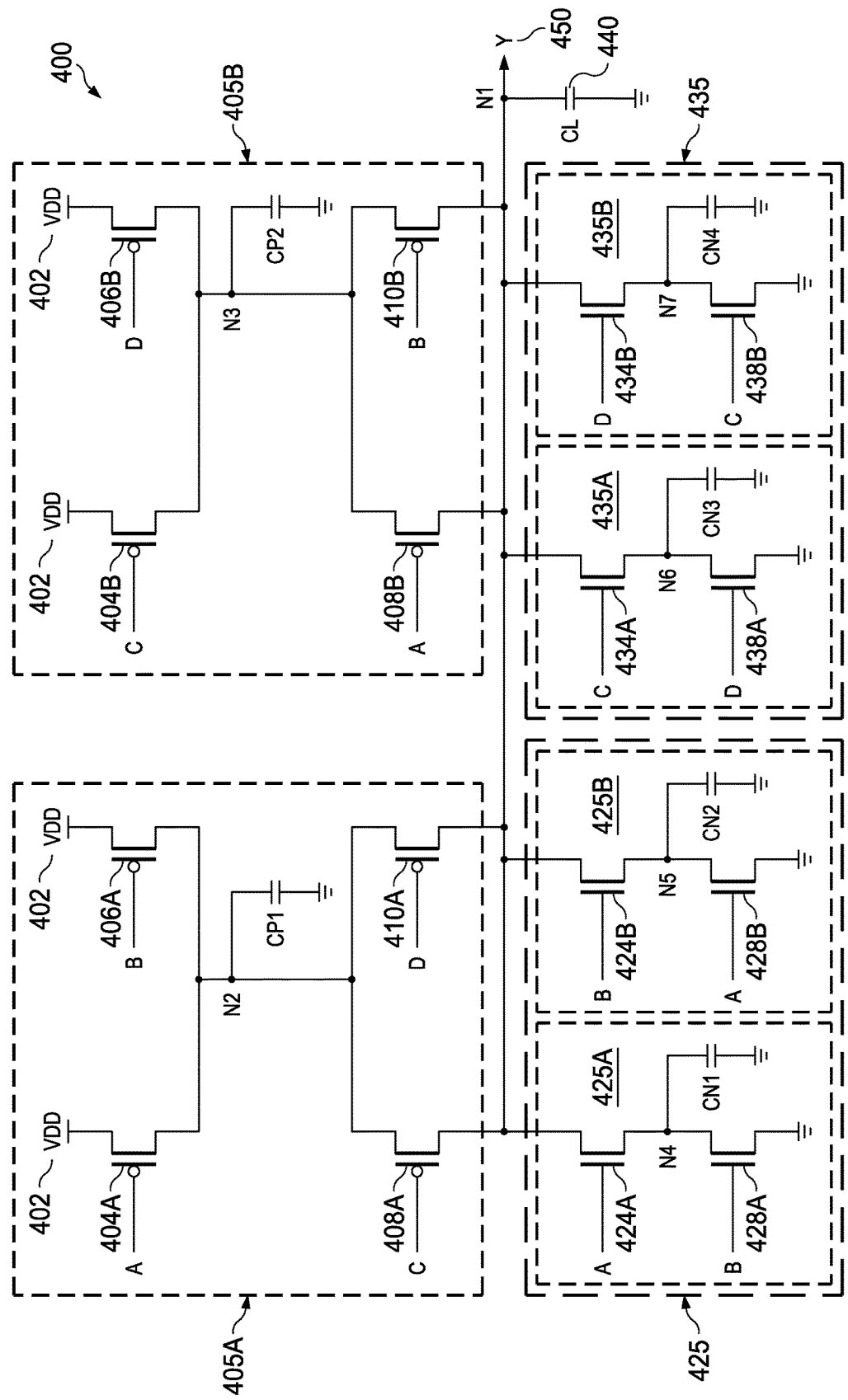
FIG. 4 illustrates a schematic of a standard cell, according to an embodiment.

FIG. 4 illustrates a schematic of a standard cell 400, according to an embodiment. The standard cell 400 includes a first PMOS stack 405A and a second PMOS stack 405B. The second PMOS stack 405B is parallel and separated from the first PMOS stack 405A.

In one version, the standard cell 400 includes one or more first PMOS stack 405A. In another version, the standard cell 400 includes one or more second PMOS stack 405B. A standard cell output Y 450 is generated at a first node N1. A load capacitance CL 440 is coupled between the first node N1 and a ground terminal.

The standard cell 400 further includes a first NMOS stack 425 and a second NMOS stack 435. The second NMOS stack 435 is parallel and separated from the first NMOS stack 425. The first NMOS stack 425 receives a first input A and a second input B. The second NMOS stack 435 receives a third input C and a fourth input D. In one version, the standard cell 400 includes one or more first NMOS stack 425. In another version, the standard cell 400 includes one or more second NMOS stack 435.

The first NMOS stack 425 includes a first NMOS sub-stack 425A and a second NMOS sub-stack 425B. In an example, the first NMOS stack 425 includes multiple first NMOS sub-stack 425A. In another example, the first NMOS stack 425 includes multiple second NMOS sub-stack 425B.

The first NMOS sub-stack 425A includes a first NMOS transistor 424A and a second NMOS transistor 428A. A gate terminal of the first NMOS transistor 424A receives the first input A, and a drain terminal of the first NMOS transistor 424A is coupled to the first node N1. A gate terminal of the second NMOS transistor 428A receives the second input B.

A drain terminal of the second NMOS transistor 428A is coupled to a source terminal of the first NMOS transistor 424A to form a fourth node N4. A first NMOS parasitic capacitance CN1 is coupled between the fourth node N4 and the ground terminal. A source terminal of the second NMOS transistor 428A is coupled to the ground terminal.

The second NMOS sub-stack 425B includes a third NMOS transistor 424B and a fourth NMOS transistor 428B. A gate terminal of the third NMOS transistor 424B receives the second input B, and a drain terminal of the third NMOS transistor 424B is coupled to the first node N1. A gate terminal of the fourth NMOS transistor 428B receives the first input A.

A drain terminal of the fourth NMOS transistor 428B is coupled to a source terminal of the third NMOS transistor 424B to form a fifth node N5. A second NMOS parasitic capacitance CN2 is coupled between the fifth node N5 and the ground terminal. A source terminal of the fourth NMOS transistor 428B is coupled to the ground terminal.

The second NMOS stack 435 includes a third NMOS sub-stack 435A and a fourth NMOS sub-stack 435B. In an example, the second NMOS stack 435 includes multiple third NMOS sub-stack 435A. In another example, the second NMOS stack 435 includes multiple fourth NMOS sub-stack 435B.

The third NMOS sub-stack 435A includes a fifth NMOS transistor 434A and a sixth NMOS transistor 438A. A gate terminal of the fifth NMOS transistor 434A receives the third input C, and a drain terminal of the fifth NMOS transistor 434A is coupled to the first node N1. A gate terminal of the sixth NMOS transistor 438A receives the fourth input D.

A drain terminal of the sixth NMOS transistor 438A is coupled to a source terminal of the fifth NMOS transistor 434A to form a sixth node N6. A third NMOS parasitic capacitance CN3 is coupled between the sixth node N6 and the ground terminal. A source terminal of the sixth NMOS transistor 438A is coupled to the ground terminal.

The fourth NMOS sub-stack 435B includes a seventh NMOS transistor 434B and an eighth NMOS transistor 438B. A gate terminal of the seventh NMOS transistor 434B receives the fourth input D, and a drain terminal of the seventh NMOS transistor 434B is coupled to the first node N1. A gate terminal of the eighth NMOS transistor 438B receives the third input C.

A drain terminal of the eighth NMOS transistor 438B is coupled to a source terminal of the seventh NMOS transistor 434B to form a seventh node N7. A fourth NMOS parasitic capacitance CN4 is coupled between the seventh node N7 and the ground terminal. A source terminal of the eighth NMOS transistor 438B is coupled to the ground terminal.

The first PMOS stack 405A includes a first PMOS transistor 404A, a second PMOS transistor 406A, a third PMOS transistor 408A and a fourth PMOS transistor 410A. A gate terminal of the first PMOS transistor 404A receives the first input A. A source terminal of the first PMOS transistor 404A is coupled to a power terminal VDD 402.

A gate terminal of the second PMOS transistor 406A receives the second input B. A source terminal of the second PMOS transistor 406A is coupled to the power terminal VDD 402. A gate terminal of the third PMOS transistor 408A receives the third input C, and a source terminal of the third PMOS transistor 408A is coupled to a drain terminal of the first PMOS transistor 404A to form a second node N2.

A gate terminal of the fourth PMOS transistor 410A receives the fourth input D, and a source terminal of the fourth PMOS transistor 410A is coupled to a drain terminal of the second PMOS transistor 406A at the second node N2. A first PMOS parasitic capacitance CP1 is coupled between the second node N2 and the ground terminal.

The second PMOS stack 405B includes a fifth PMOS transistor 404B, a sixth PMOS transistor 406B, a seventh PMOS transistor 408B and an eighth PMOS transistor 410B. A gate terminal of the fifth PMOS transistor 404B receives the third input C. A source terminal of the fifth PMOS transistor 404B is coupled to the power terminal VDD 402.

A gate terminal of the sixth PMOS transistor 406B receives the fourth input D. A source terminal of the sixth PMOS transistor 406B is coupled to the power terminal VDD 402. A gate terminal of the seventh PMOS transistor 408B receives the first input A, and a source terminal of the seventh PMOS transistor 408B is coupled to a drain terminal of the fifth PMOS transistor 404B to form a third node N3.

A gate terminal of the eighth PMOS transistor 410B receives the second input B, and a source terminal of the eighth PMOS transistor 410B is coupled to a drain terminal of the sixth PMOS transistor 406B at the third node N3. A second PMOS parasitic capacitance CP2 is coupled between the third node N3 and the ground terminal.

It is understood that the parasitic capacitances are physical representation of capacitances created between drain terminal and ground terminal of the transistors associated with the respective nodes. The standard cell 400 may include one or more additional components known to those skilled in the relevant art and are not discussed here for simplicity of the description.

The operation of the standard cell 400 illustrated in FIG. 4 is explained now. When the fourth input D transition from a logic low to a logic high, the first input A is at logic high, the second input B is at logic low, the third input C is at logic high, the standard cell output Y 450 transitions from a logic high to a logic low. During these transitions, the load capacitance CL 440, the second PMOS parasitic capacitance CP2, the first NMOS parasitic capacitance CN1 and the third NMOS parasitic capacitance CN3 are discharged.

Similarly, when the third input C transition from a logic low to a logic high, the first input A is at logic high, the second input B is at logic low, the fourth input D is at logic high, the standard cell output Y 450 transitions from a logic high to a logic low. During these transitions, the load capacitance CL 440, the second PMOS parasitic capacitance CP2, the first NMOS parasitic capacitance CN1 and the fourth NMOS parasitic capacitance CN4 are discharged.

When the second input B transition from a logic low to a logic high, the first input A is at logic high, the third input C is at logic high, the fourth input D is at logic low, the standard cell output Y 450 transitions from a logic high to a logic low. During these transitions, the load capacitance CL 440, the first PMOS parasitic capacitance CP1, the first NMOS parasitic capacitance CN1 and the third NMOS parasitic capacitance CN3 are discharged.

The transitions discussed above and the corresponding transition in the standard cell output Y 350 represents worst path delays of the standard cell 400. The usability of a standard cell is determined from the worst path delay of the standard cell.

Thus, the worst path delay of the standard cell 400 is reduced as compared to existing standard cells. The standard cell 400 requires only three parasitic capacitances to be charged in addition to the load capacitance CL 440, whereas existing standard cell is required to charge four to six parasitic capacitances during transitions of inputs and the corresponding transition in the standard cell output.

Thus, the standard cell 400 provides reduced cell delay. A delay between an instant when an input provided to the standard cell 400 transition to an instant when the standard cell output Y transitions is very low in the standard cell 400 as compared to solutions known in the art. Thus, the standard cell 400 finds usage in high speed digital blocks.

In one version, the worst path delays of all input to output of the standard cell 400 is reduced by a margin of 7-12% as compared to existing solutions. The solution is applicable to several cell functionalities in a standard cell library.

When a defined delay is required, a tool in the standard cell library selects a particular standard cell based on the worst path delay. A method to reduce the worst path delay would aid the tool in selecting a standard cell with lower worst path delay to meet the defined delay requirements. For example, a 6× drive standard cell with proposed schematic would be sufficient to meet the defined delay of an 8× drive standard cell in the existing schematic. This results in significant area savings at chip level. In one version, the chip area was reduced by 18% due to the introduction of several functionalities implementing proposed standard cells in the standard cell library.

With reduced drive strength cell usage (for example, 6× instead of 8×), to meet the defined delays at chip level, the leakage and dynamic power are also reduced. In one implementation, reduction of 22 and 29% of dynamic and leakage power respectively were achieved due to the introduction of the several functionalities implementing proposed standard cells in the standard cell library. Also, it provides a frequency improvement of 2 to 5% because of the reduced worst path delay.

Figure 5:
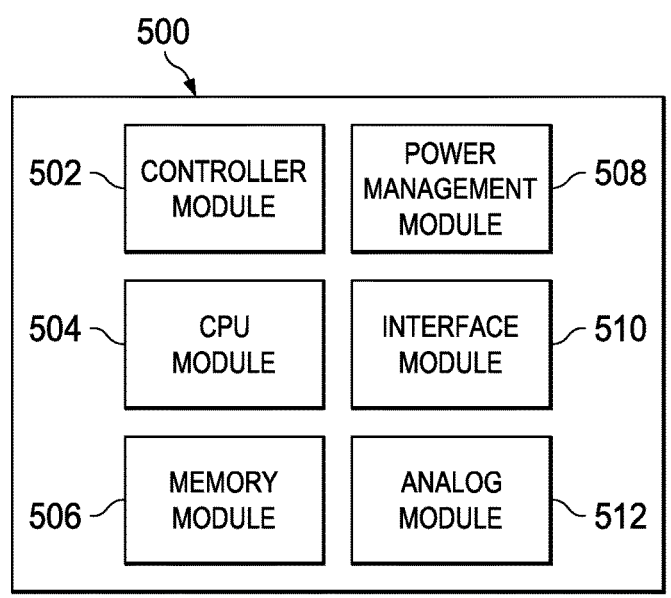
FIG. 5 illustrates a block diagram of an integrated circuit (IC), according to an embodiment.

FIG. 5 illustrates a block diagram of an integrated circuit (IC) 500, according to an embodiment. The IC 500 includes a plurality of modules. The plurality of modules includes, but not limited to, a controller module 502, a CPU module 504, a memory module 506, a power management module 508, an interface module 510 and an analog module 512. The CPU module 504 is a processing unit. The processing unit can be, for example, a CISC-type (Complex Instruction Set Computer) CPU, RISC-type CPU (Reduced Instruction Set Computer), or a digital signal processor (DSP).

The memory module 506 can be memory such as RAM, flash memory, or disk storage. The power management module 508 can be a voltage regulator, or DC-DC converter. The analog module 512 can be ADC (analog-to-digital converter), DAC (digital-to analog converter), or comparator. The interface module 510 can be I2C, LVDS or USB.

At least one module of the plurality of modules includes a standard cell. The standard cell is similar to at least one of the standard cell 200, standard cell 300 and standard cell 400. The worst path delay of the standard cell is lower as compared to existing standard cells.

In addition, a delay between an instant when an input is provided to the standard cell to an instant when the standard cell output Y transitions, is very low in the standard cell as compared to solutions known in the art. The standard cell also provides for dynamic and leakage power reduction in the plurality of modules.

The term "high" is generally intended to describe a signal that is at logic "1," and the term "low" is generally intended to describe a signal that is at logic "0." The term "on" applied to a transistor or group of transistors is generally intended to describe gate biasing to enable current flow through the transistor or transistors. Also, the terms "deactivation" or "deactivated" or turn "OFF" or turned "OFF" is used to describe a deactivation of a device, a component or a signal. The terms "activation" or "activated" or turned "ON" describes activation of a device, a component or a signal.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A standard cell for use in an integrated circuit comprising:
   a first PMOS transistor whose gate terminal is configured to receive a first input and whose drain terminal is coupled to a first node;
   a second PMOS transistor whose gate terminal is configured to receive a second input and whose drain terminal is coupled to the first node;
   a first NMOS transistor whose gate terminal is configured to receive the first input and whose drain terminal is coupled to the first node;
   a second NMOS transistor whose gate terminal is configured to receive the second input and whose drain terminal is coupled to a source terminal of the first NMOS transistor to form a second node;
   a third NMOS transistor whose gate terminal is configured to receive the second input and whose drain terminal is coupled to the first node; and
   a fourth NMOS transistor whose gate terminal is configured to receive the first input and whose drain terminal is coupled to a source terminal of the third NMOS transistor to form a third node.

2. The standard cell for use in an integrated circuit of claim 1, wherein a source terminal of each of the first PMOS transistor and the second PMOS transistor is coupled to a power terminal.

3. The standard cell for use in an integrated circuit of claim 1, wherein, a source terminal of each of the second NMOS transistor and the fourth NMOS transistor is coupled to a ground terminal.

4. The standard cell for use in an integrated circuit of claim 1 further comprising a standard cell output generated at the first node, and a load capacitance coupled between the first node and the ground terminal.

5. The standard cell for use in an integrated circuit of claim 1 further comprising a first parasitic capacitance coupled between the second node and the ground terminal, and a second parasitic capacitance coupled between the third node and the ground terminal.

6. The standard cell for use in an integrated circuit of claim 1, wherein the load capacitance and the first parasitic capacitance are discharged when the second input transitions from a logic low to a logic high, the first input is at logic high, and the standard cell output transitions from a logic high to a logic low.

7. The standard cell for use in an integrated circuit of claim 1, wherein the load capacitance and the first parasitic capacitance are charged when the second input transitions from a logic high to a logic low, the first input is at logic high, and the standard cell output transitions from a logic low to a logic high.

8. A standard cell for use in an integrated circuit comprising:
   a first PMOS transistor whose gate terminal is configured to receive a first input and whose source terminal is coupled to a power terminal;
   a second PMOS transistor whose gate terminal is configured to receive a second input and whose source terminal is coupled to a drain terminal of the first PMOS transistor to form a second node;
   a third PMOS transistor whose gate terminal is configured to receive the second input and whose source terminal is coupled to the power terminal;
   a fourth PMOS transistor whose gate terminal is configured to receive the first input and whose source terminal is coupled to the drain terminal of the third PMOS transistor to form a third node;
   a first NMOS transistor whose gate terminal is configured to receive the first input and whose drain terminal is coupled to a first node; and
   a second NMOS transistor whose gate terminal is configured to receive the second input and whose drain terminal is coupled to the first node, wherein a drain terminal of each the second PMOS transistor and the fourth PMOS transistor are coupled to the first node.

9. The standard cell for use in an integrated circuit of claim 8 further comprising:
   a load capacitance coupled between the first node and a ground terminal;
   a first parasitic capacitance coupled between the second node and the ground terminal;
   a second parasitic capacitance coupled between the third node and the ground terminal; and
   a standard cell output generated at the first node.

10. The standard cell for use in an integrated circuit of claim 8, wherein the load capacitance and the second parasitic capacitance are discharged when the second input transitions from a logic low to a logic high, the first input is at logic low, and the standard cell output transitions from a logic high to a logic low.

11. The standard cell for use in an integrated circuit of claim 8, wherein the load capacitance and the second parasitic capacitance are charged when the second input transitions from a logic high to a logic low, the first input is at logic low, and the standard cell output transitions from a logic low to a logic high.

12. A standard cell for use in an integrated circuit comprising:
   a first PMOS stack;
   a second PMOS stack parallel and separated from the first PMOS stack;
   a first NMOS stack configured to receive a first input and a second input, the
   first NMOS stack comprising a first NMOS sub-stack and a second NMOS sub-stack; and
   a second NMOS stack parallel and separated from the first NMOS stack and configured to receive a third input and a fourth input, the second NMOS stack comprising a third NMOS sub-stack and a fourth NMOS sub-stack.

13. The standard cell for use in an integrated circuit of claim 12, wherein:
   the first NMOS sub-stack comprises:
      a first NMOS transistor whose gate terminal is configured to receive the first input and whose drain terminal is coupled to a first node; and
      a second NMOS transistor whose gate terminal is configured to receive the second input and whose drain terminal is coupled to a source terminal of the first NMOS transistor to form a fourth node;
   the second NMOS sub-stack comprises:

a third NMOS transistor whose gate terminal is configured to receive the second input and whose drain terminal is coupled to the first node; and a fourth NMOS transistor whose gate terminal is configured to receive the first input and whose drain terminal is coupled to a source terminal of the third NMOS transistor to form a fifth node.

14. The standard cell for use in an integrated circuit of claim 12, wherein:

the third NMOS sub-stack comprises:

a fifth NMOS transistor whose gate terminal is configured to receive the third input and whose drain terminal is coupled to the first node; and a sixth NMOS transistor whose gate terminal is configured to receive the fourth input and whose drain terminal is coupled to a source terminal of the fifth NMOS transistor to form a sixth node;

the fourth NMOS sub-stack comprises:

a seventh NMOS transistor whose gate terminal is configured to receive the fourth input and whose drain terminal is coupled to the first node; and an eighth NMOS transistor whose gate terminal is configured to receive the third input and whose drain terminal is coupled to a source terminal of the seventh NMOS transistor to form a seventh node.

15. The standard cell for use in an integrated circuit of claim 12, wherein the first PMOS stack comprises:

a first PMOS transistor whose gate terminal is configured to receive the first input and whose source terminal is coupled to a power terminal;

a second PMOS transistor whose gate terminal is configured to receive the second input and whose source terminal is coupled to the power terminal;

a third PMOS transistor whose gate terminal is configured to receive the third input and whose source terminal is coupled to a drain terminal of the first PMOS transistor to form a second node;

a fourth PMOS transistor whose gate terminal is configured to receive the fourth input and whose source terminal is coupled to a drain terminal of the second PMOS transistor at the second node.

16. The standard cell for use in an integrated circuit of claim 12, wherein the second PMOS stack comprises:

a fifth PMOS transistor whose gate terminal is configured to receive the third input and whose source terminal is coupled to the power terminal;

a sixth PMOS transistor whose gate terminal is configured to receive the fourth input and whose source terminal is coupled to the power terminal;

a seventh PMOS transistor whose gate terminal is configured to receive the first input and whose source terminal is coupled to a drain terminal of the fifth PMOS transistor to form a third node;

an eighth PMOS transistor whose gate terminal is configured to receive the second input and whose source terminal is coupled to a drain terminal of the sixth PMOS transistor at the third node.

17. The standard cell for use in an integrated circuit of claim 12 further comprising:

a load capacitance coupled between the first node and the ground terminal;

a first PMOS parasitic capacitance coupled between the second node and the ground terminal;

a second PMOS parasitic capacitance coupled between the third node and the ground terminal;

a first NMOS parasitic capacitance coupled between the fourth node and the ground terminal;

a second NMOS parasitic capacitance coupled between the fifth node and the ground terminal;

a third NMOS parasitic capacitance coupled between the sixth node and the ground terminal;

a fourth NMOS parasitic capacitance coupled between the seventh node and the ground terminal; and a standard cell output is generated at the first node.

18. The standard cell for use in an integrated circuit of claim 12, wherein the load capacitance, the second PMOS parasitic capacitance, the first NMOS parasitic capacitance and the third NMOS parasitic capacitance are discharged when the fourth input transition from a logic low to a logic high, the first input is at logic high, the second input is at logic low, the third input is at logic high, and the standard cell output transitions from a logic high to a logic low.

19. The standard cell for use in an integrated circuit of claim 12, wherein the load capacitance, the second PMOS parasitic capacitance, the first NMOS parasitic capacitance and the fourth NMOS parasitic capacitance are discharged when the third input transition from a logic low to a logic high, the first input is at logic high, the second input is at logic low, the fourth input is at logic high, and the standard cell output transitions from a logic high to a logic low.

20. An integrated circuit comprising:

a plurality of modules, at least one module comprising a standard cell, the standard cell comprising:

a first PMOS transistor whose gate terminal is configured to receive a first input and whose drain terminal is coupled to a first node;

a second PMOS transistor whose gate terminal is configured to receive a second input and whose drain terminal is coupled to the first node;

a first NMOS transistor whose gate terminal is configured to receive the first input and whose drain terminal is coupled to the first node;

a second NMOS transistor whose gate terminal is configured to receive the second input and whose drain terminal is coupled to a source terminal of the first NMOS transistor to form a second node;

a third NMOS transistor whose gate terminal is configured to receive the second input and whose drain terminal is coupled to the first node; and a fourth NMOS transistor whose gate terminal is configured to receive the first input and whose drain terminal is coupled to a source terminal of the third NMOS transistor to form a third node.

\* \* \* \* \*